United States Patent [19]

Willsey

[11] 3,854,568
[45] Dec. 17, 1974

[54] ARTICLE HANDLING APPARATUS
[75] Inventor: Charles H. Willsey, Topeka, Kans.
[73] Assignee: Seymour Foods, Inc., Topeka, Kans.
[22] Filed: Mar. 16, 1973
[21] Appl. No.: 341,959

Related U.S. Application Data
[62] Division of Ser. No. 177,931, Sept. 7, 1971, Pat. No. 3,752,340.

[52] U.S. Cl. ................................. 198/30, 198/29
[51] Int. Cl. ............................................ B65g 47/26
[58] Field of Search ....... 198/29, 30, 168, 172, 173, 198/106, 33 R, 33 AB, 33 AC, 160, 166, 31 R, 31 AB, 31 AC; 221/224; 222/196, 200; 209/73, 424, 426, 441, 442, 446, 462

[56] References Cited
UNITED STATES PATENTS
3,139,176  6/1964  Bliss .................................. 198/168
3,386,557  6/1968  Ross et al. ....................... 198/33 AA
3,386,560  6/1968  Ross et al. ........................... 198/160
3,716,127  2/1973  Loeffler .............................. 198/30

Primary Examiner—Evon C. Blunk
Assistant Examiner—Joseph E. Valenzo
Attorney, Agent, or Firm—Guy A. Greenawalt

[57] ABSTRACT

An apparatus for loading egg processing or handling equipment which comprises a reciprocably mounted support forming an accumulator table which is disposed in a generally horizontal position and interposed between a supply conveyor and a lane forming apparatus for which the accumulator table serves as a reservoir from which the eggs are transferred in parallel lines or row formation with the table being vibrated laterally to agitate the eggs and prevent pile up.

5 Claims, 5 Drawing Figures

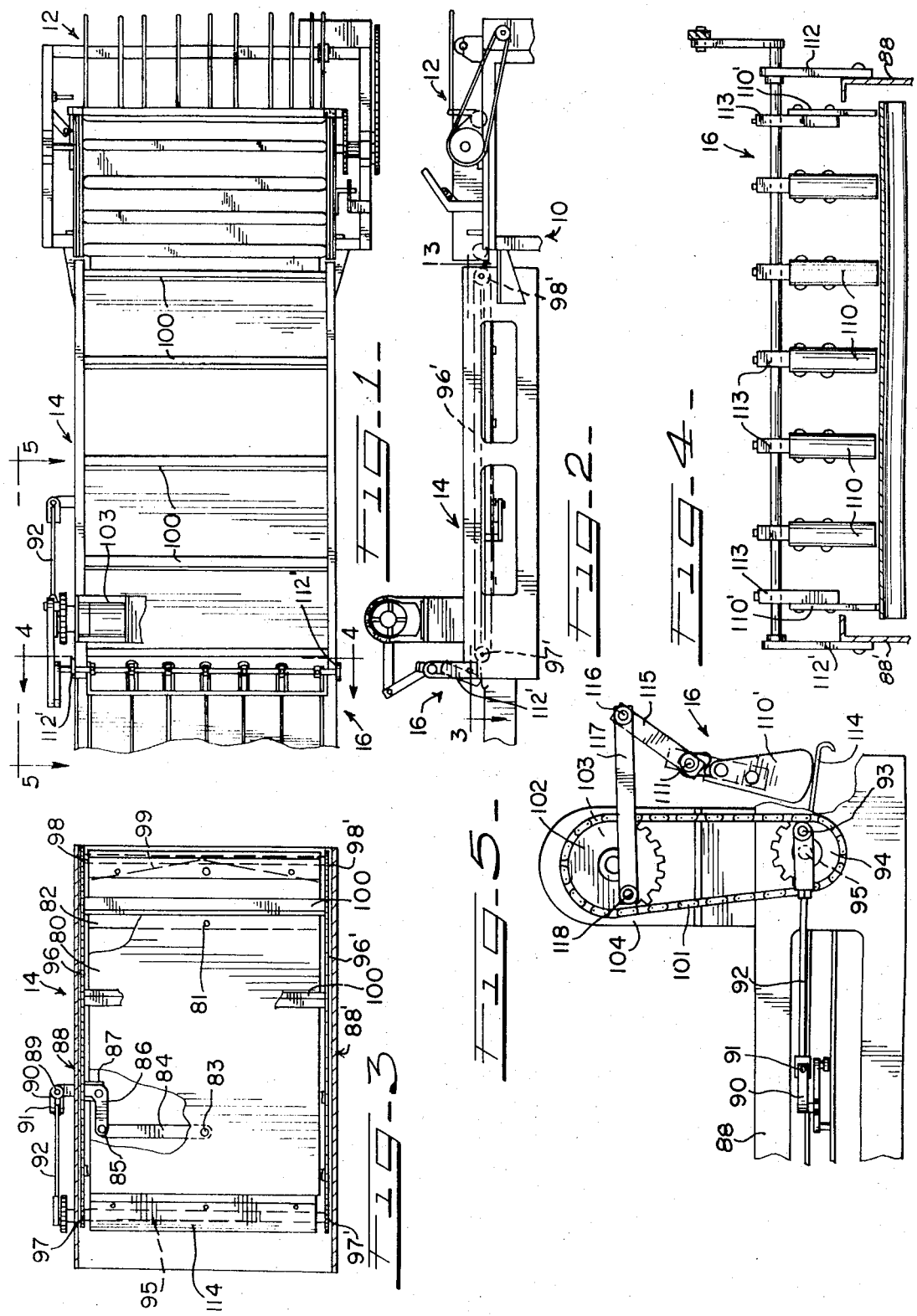

ARTICLE HANDLING APPARATUS

This application is a division of Ser. No. 177,931, filed Sept. 7, 1971, now U.S. Pat. No. 3,752,340, granted Aug. 14, 1974.

This invention relates to apparatus for the handling of eggs or the like and is more particularly concerned with improvements in apparatus forming a reservoir or an accumulating area from which they may be advanced so as to provide a continuous supply for loading, processing or other egg handling equipment such as egg washing machines, packing machines, or the like.

In the handling or processing of eggs, it is generally necessary to load the equipment with eggs supplied from filler flats which have been removed from the conventional bulk shipping crate in which the eggs are initially packed by the original supplier. Various arrangements have been provided for unloading the filler flats and arranging the eggs for delivery to the processing or handling equipment. Generally, the eggs have been removed from the filler flats and placed on a conveyor leading to the processing apparatus without any arrangement for insuring a constant supply to the processing apparatus. It is a general object, therefore, of the present invention to provide an apparatus for providing a constant supply of eggs to a processing machine by interposing in the supply line an improved accumulator reservoir in which the eggs are accumulated and from which the eggs are withdrawn in predetermined arrangement and fed to the loading processing or handling equipment, automatically. A more specific object of the invention is to provide an improved accumulator apparatus for receiving eggs from a traveling conveyor which is operative to advance the eggs to the accumulator apparatus in random arrangement and number and from which they are withdrawn in a predetermined multiple-line arrangement.

Another object of the invention is to provide an egg handling apparatus which comprises a conveyor means for advancing eggs to a gathering or accumulating area where a supply of the eggs may be maintained while additional eggs are moved into the area and with provision for allowing the eggs to advance out of the area in a predetermined arrangement so as to serve as a feeder for maintaining a constant supply of eggs in processing or handling equipment, such as, a washer, grader, packer or the like.

A further object of the invention is to provide egg handling or transfer equipment which includes an apparatus for accumulating a supply of the eggs wherein the eggs are advanced by a traveling conveyor means along a table to an area where there is space for a substantial number of the eggs to be accumulated for delivery therefrom, in predetermined regular order, to other equipment, for example, into a series of lanes, with provision for imparting to the table on which the eggs are accumulating a relatively small laterally reciprocating or vibrating movement so as to agitate the accumulating eggs to a degree sufficient to insure that there is no jamming, blocking or piling up of the eggs which will impede their advance when they are otherwise free to move forward as a result of advancing movement of the eggs in the lanes ahead of them.

These and other objects and advantages of the invention will be apparent from a consideration of the egg handling apparatus which is shown by way of illustration in the accompanying drawings wherein:

FIG. 1 is a plan view showing an apparatus for handling eggs which incorporates therein an accumulator table having the principal features of the invention;

FIG. 2 is a side elevation of the apparatus shown in FIG. 1;

FIG. 3 is a sectional view, taken on the line 3—3 of FIG. 2 and with portions broken away, showing the mechanism for oscillating the accumulator table;

FIG. 4 is a cross sectional view taken on the line 4—4 of FIG. 1, to a larger scale and with portions broken away; and FIG. 5 is a partial side elevation on the line 5—5 of FIG. 1 and with portions broken away, showing the drive for the slat conveyor and the lane forming apparatus at the discharge end of the accumulator table.

Referring to FIGS. 1 and 2 of the drawings, there is illustrated an apparatus designed especially for handling shell eggs which incorporates an accumulator apparatus having the principal features of the invention and which is particularly adapted for use in loading egg processing or handling equipment such as egg washing machines, packers or the like. The illustrated apparatus comprises an elongate, upright, supporting frame 10 with mechanism 12 at the receiving end for inverting a loaded filler flat and transferring the eggs to an associated conveyor which advances them to a reservoir-forming table assembly 14 on which the eggs are accumulated and advanced to an aligning gate assembly 16 at the discharge end of the apparatus. The illustrated apparatus is particularly adapted as a feeder to be disposed at the entrance end of an egg washing machine, or the like, so as to enable a constant supply of eggs to be loaded onto the washing machine conveyor which carries them through the washing cycle. The filler flats may be deposited on the inverting mechanism 12 manually or by any suitable mechanical arrangement.

The filler flat inverting and emptying or unloading mechanism 12 at the entrance end of the apparatus is fully described in the parent application now U.S. Pat. No. 3,752,340.

The reservoir or accumulator apparatus 14 (FIGS. 1 to 5) comprises a support plate 80 which is pivoted at 81 on a cross piece 82 on the main frame 10 and which is disposed in a horizontal plane. At its other end the support plate 80 is pivotally connected at 83 to a laterally extending link 84. The link 84 is pivoted at 85 to one arm of a bell crank 86, the latter being pivoted at 87 to the frame side piece 88. The other arm of the bell crank 86 is pivotally connected at 89 to a yoke 90 which in turn is pivotally connected at 91 to the end of an elongate pitman rod 92. The pitman rod 92 has an eccentric connection at 93 with a sprocket 94 on a driven cross shaft 95 which is journaled in the side frame members 88 and 88'. The shaft 95 supports a pair of laterally spaced chains 96 and 96' by means of sprockets 97 and 97'. The chains 96 and 96' are supported at the other end of the support plate 80 by sprockets 98, 98' mounted on a cross shaft 99 journaled in the side frame members 88 and 88'. A series of cross slats 100 are carried on the chains 96 and 96' with the top run thereof advancing over the top surface of the table forming plate member 80 so as to advance the eggs along the table surface to the discharge end of the reservoir apparatus 14. The sprocket 94 on the shaft 95 is connected by chain 101 with a power output sprocket 102 on drive motor 103 which is supported on a top cross frame 104. The laterally reciprocating movement of the table forming plate 80 is of relatively small amplitude but sufficient to agitate the eggs as they are moved to the discharge end of the apparatus by the slats 100. The cross slats 100 are relatively thin and when the eggs form an accumulation at the discharge end, the slats 100 will pass beneath the same without damage to the eggs.

The lane forming apparatus 16 (FIGS. 4 and 5) at the discharge end of the reservoir 14 comprises a series of laterally spaced members 110 which are disposed in vertically and longitudinally extending planes and in depending relation from a cross rod 111, the latter being journaled in the upper ends of bracket members 112, 112' which are mounted on the accumulator side frame members 88, 88'. Each of the intermediate members 110 is formed by a relatively thin plate, preferably of plastic, which is bent to a generally U shape in horizontal cross section with the leg portions of generally triangular shape in elevation so as to present a rounded, relatively wide, generally vertical edge face in the direction of the oncoming eggs and extending in a generally vertical plane. The end members 110' are in the form of a single plate member of similar shape. Each of the lane members 110, 110' is mounted on the support rod 111 by means of a mounting block 113 with the bottom edge of each free to swing clear of a pad member 114 at the end of the accumulator floor. An arm 115 extends at the end of rod 111 and is pivotally connected at 116 to a pitman rod 117 which has an eccentric connection at 118 with the drive sprocket 102 so as to oscillate the cross rod 111. The oscillating movement is relatively small and provides a means for insuring that the eggs will pass between the plates and into the desired lanes without jamming.

In the use of the illustrated apparatus slats 100 advance the eggs to the lane forming members 110, 110' where they may form an accumulation, insuring that the lanes remain full. The slats 100 are, of course, advanced beneath any eggs which accumulate at the entrance to the lane forming members 110, 110' when the lanes are filled to overflowing. The vibrating or lateral oscillating motion of the plate 80 is of relatively small amplitude so as to agitate the eggs and keep them advancing into the lanes formed by the members 110, 110'. The relatively small oscillating or swinging movement of lane members 110, 110' on the support shaft 111 insures that the eggs will not be hung up on the edges of members 110, 110' or form a jam at any of the lane entrances.

I claim:

1. In an apparatus for handling eggs or similar articles, a horizontally disposed supporting table member of a length and width sufficient to provide an area for accumulating a substantial quantity of eggs thereon, means for advancing eggs along the surface of said table to said accumulating area which egg advancing means includes egg engaging means operative to normally move the eggs along said table surface and to brush past the eggs when they meet an obstruction, means at the leading end of said accumulating area and depending between the eggs for guiding the eggs into a plurality of laterally spaced lanes and means for imparting sufficient oscillating movement to said table surface in a direction laterally of the path of advance of the eggs to agitate the eggs when they are approaching the entrance to said lanes so as to prevent piling up at the entrance to said lanes and facilitate the entry of the eggs into said lanes.

2. In an apparatus for handling eggs or similar articles as set forth in claim 1 wherein said means for advancing eggs along the surface of said table comprises laterally spaced, endless chains mounted on laterally spaced end psrockets and longitudinally spaced cross members extending between said chains which travel in a path adjacent the top surface of said supporting table and normally engage the eggs so as to advance the eggs along the table surface and which brush past the eggs when the eggs meet an obstruction without damage to the eggs.

3. In an apparatus for handling eggs or similar articles as set forth in claim 2 wherein said cross members are relatively narrow strip members which are positioned to ride on the top surface of said supporting table and which are sufficiently thin to advance beneath the eggs when the eggs meet an obstruction so as to brush past the eggs without damaging the eggs.

4. In an apparatus for handling eggs or similar articles as set forth in claim 1 wherein said supporting table member comprises a plain surface plate member which is disposed horizontally, said plate member being mounted on a vertical pivot means for movement about a vertical axis at the trailing end onto which the eggs are fed and means connected to said plate member for imparting limited, lateral, reciprocating movement at the leading end from which the eggs are discharged.

5. In an apparatus for handling eggs or similar articles as set forth in claim 1 wherein said egg supporting table member terminates at the leading end at said means for guiding the eggs into said lanes, and wherein said means for guiding said eggs into said lanes comprises a plurality of laterally spaced divider plate members mounted in depending relation on a cross member which divider plate members extend between the eggs advancing on said table member and means for oscillating the cross member about an axis extending transversely of said table member so as to swing said divider plate members through a relatively small arc in a longitudinal path beneath said cross member and adjacent the end of said table member and thereby guide the eggs into a plurality of lanes which accommodate the eggs in single file arrangement.

* * * * *